(12) United States Patent
Patenaude et al.

(10) Patent No.: US 12,488,645 B2
(45) Date of Patent: Dec. 2, 2025

(54) SYSTEM AND METHOD FOR FACILITATING SERVICE VEHICLE ACCESS

(71) Applicant: GM Global Technology Operations LLC, Detroit, MI (US)

(72) Inventors: Russell A. Patenaude, Macomb Township, MI (US); Matthew Edward Gilbert-Eyres, Rochester Hills, MI (US); Adam Lee Wright, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 18/534,216

(22) Filed: Dec. 8, 2023

(65) Prior Publication Data
US 2025/0191429 A1 Jun. 12, 2025

(51) Int. Cl.
*G07C 9/32* (2020.01)
(52) U.S. Cl.
CPC .................................. *G07C 9/32* (2020.01)
(58) Field of Classification Search
None
See application file for complete search history.

(56) References Cited

U.S. PATENT DOCUMENTS

| | | | |
|---|---|---|---|
| 10,699,580 B1* | 6/2020 | Gross | G05D 1/0022 |
| 12,183,200 B1* | 12/2024 | Lambert | G08G 1/146 |
| 2003/0137435 A1* | 7/2003 | Haddad | G08G 1/127 340/994 |
| 2022/0144100 A1* | 5/2022 | Tamutus | E01B 25/34 |
| 2022/0291398 A1* | 9/2022 | Athey | G01T 1/169 |
| 2022/0309925 A1* | 9/2022 | Schwendimann | G08G 1/096883 |
| 2022/0410937 A1* | 12/2022 | Parasuram | B60W 30/08 |
| 2023/0065647 A1* | 3/2023 | Foster | G08G 1/096725 |
| 2023/0103839 A1* | 4/2023 | Nelson | G07C 5/0841 726/4 |
| 2023/0138112 A1* | 5/2023 | Gross | G05D 1/0038 701/24 |

(Continued)

FOREIGN PATENT DOCUMENTS

| | | | | |
|---|---|---|---|---|
| JP | 7180364 B2 * | 11/2022 | | B60W 30/08 |
| KR | 20190103089 A * | 9/2019 | | H04W 4/90 |

*Primary Examiner* — Fekadeselassie Girma
(74) *Attorney, Agent, or Firm* — Honigman LLP; Matthew H. Szalach; Jonathan P. O'Brien

(57) ABSTRACT

A system for controlling movement of a vehicle is provided and includes data processing hardware that performs operations comprising monitoring contextual events in a current, parked location of a vehicle, detection of a contextual event indicating an impending presence of a service vehicle requiring access to the parked location of the vehicle. The operations also comprise monitoring at least one vehicle sensor of the vehicle, the at least one vehicle sensor providing sensor data to the data processing hardware for use by the data processing hardware in determining the presence of a service vehicle in an area where the vehicle is parked and moving the vehicle from the current, parked location of the vehicle to a different location in response to detection of a contextual event or determination of the presence of a service vehicle in the area where the vehicle is parked.

20 Claims, 3 Drawing Sheets

(56) References Cited

U.S. PATENT DOCUMENTS

| | | | | |
|---|---|---|---|---|
| 2023/0154265 A1* | 5/2023 | Marrone | ............... | G07C 9/32 |
| | | | | 340/5.74 |
| 2024/0070213 A1* | 2/2024 | Xu | ............... | G06F 16/9538 |
| 2024/0092175 A1* | 3/2024 | Hosey | ............... | B60L 58/24 |
| 2024/0095418 A1* | 3/2024 | Lopatine | ............... | G09B 9/05 |
| 2024/0135819 A1* | 4/2024 | Khalid | ............... | G08G 1/16 |
| 2024/0198955 A1* | 6/2024 | Yassin | ............... | B60R 25/102 |

* cited by examiner

FIG. 2
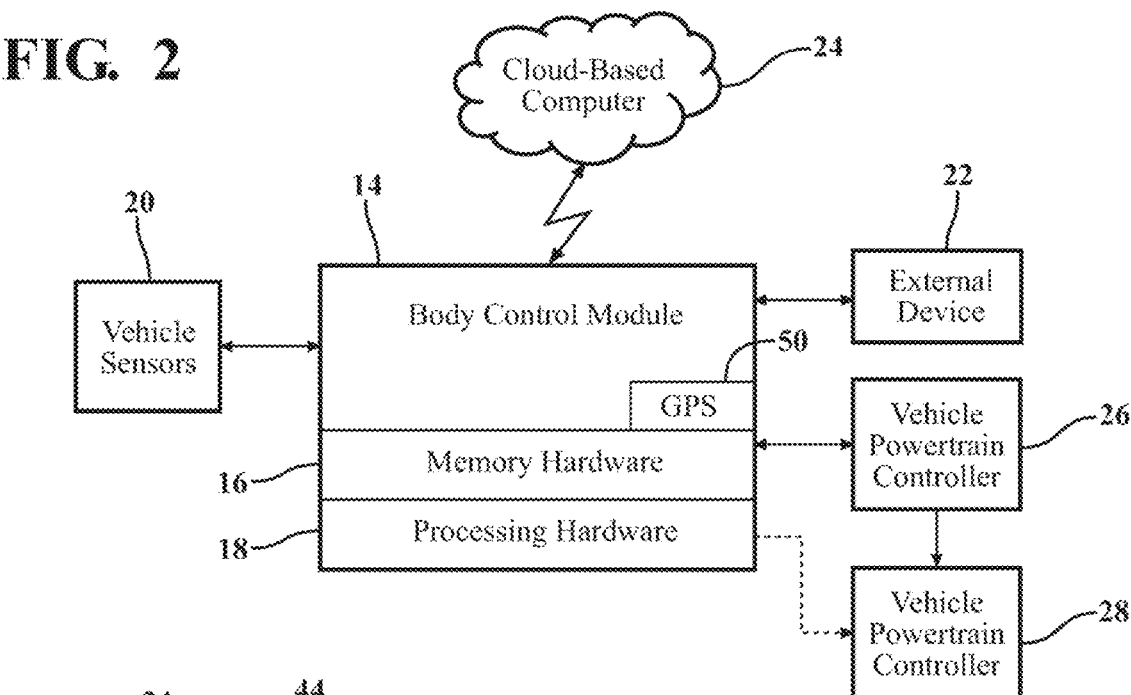
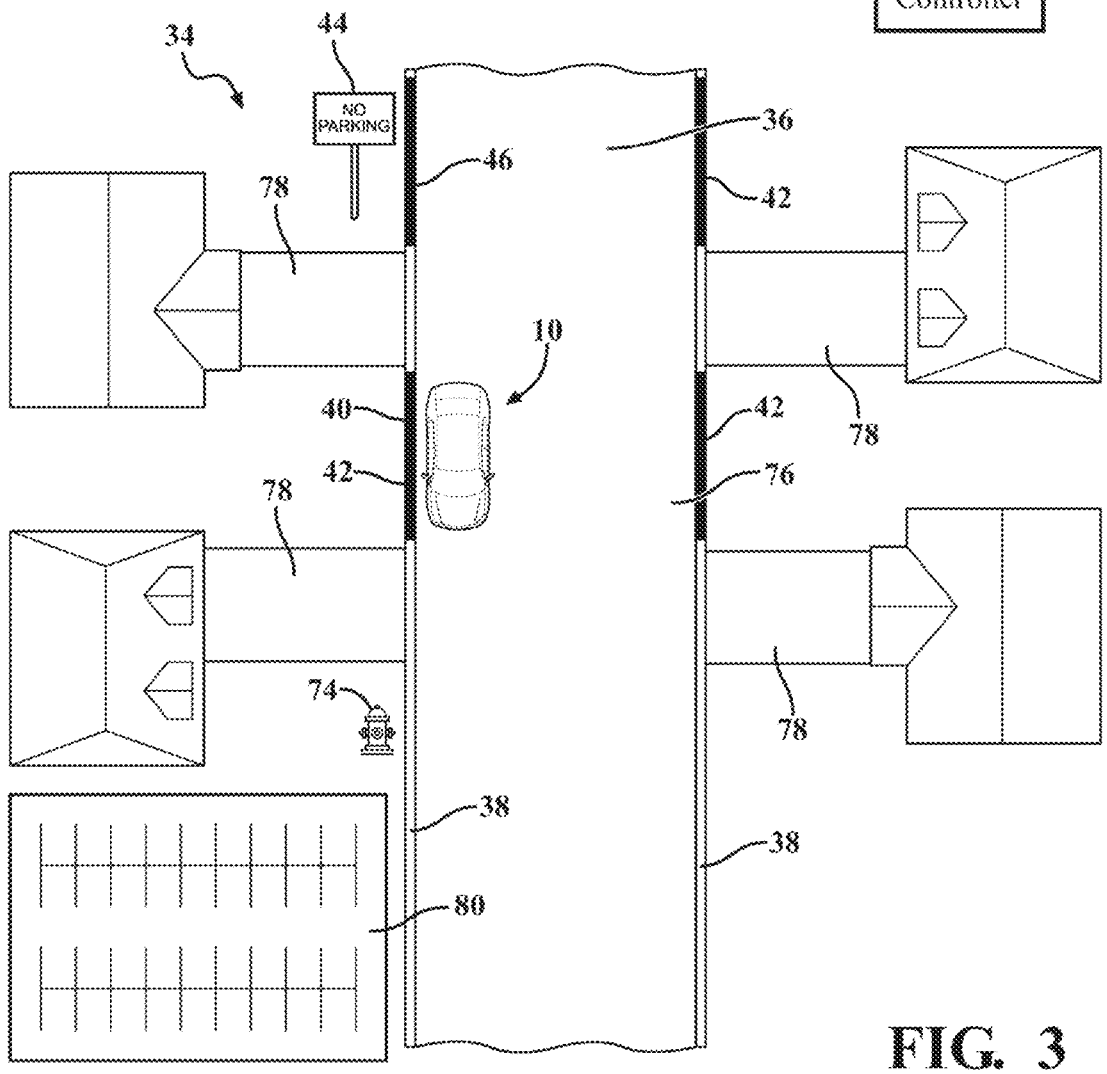
FIG. 3

SYSTEM AND METHOD FOR FACILITATING SERVICE VEHICLE ACCESS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for facilitating service vehicle access.

Demand for delivery and service vehicles has grown exponentially over the last decade and will continue to grow, as the demand for home delivery of goods and services continues to increase. For example, online shopping continues to grow and, as a result, increases the demand for home delivery of online purchases. The increase in demand for home delivery has likewise increased the number of delivery vehicles and delivery personnel on roadways, in residential neighborhoods, and in cities.

Delivery vehicles, while serving a useful function, are often required to double park or otherwise block traffic due to unavailability or lack of accessibility to designated parking spaces when stopped and a driver or other delivery personnel is delivering a package to a business or residence. While delivery personnel often have little choice but to double park, block traffic, or otherwise impede the flow of traffic on a residential or city street, such actions may lead to inefficiencies at the least and harm to others in extreme cases. For example, blocking traffic may result in other vehicles being required to stop and idle until a delivery is complete and the delivery personnel returns to the delivery vehicle. Such stopping and idling wastes time and unnecessarily consumes fuel and/or energy caused by the idling vehicles. Further, if an emergency vehicle such as a firetruck or ambulance is caused to stop and wait for a double-parked delivery truck or is otherwise impeded by a delivery truck, such an emergency vehicle could be prevented from timely arriving at a hospital or to the scene of an emergency.

With the ever-increasing volume of delivery trucks and delivery personnel on roadways, in residential neighborhoods, and in cities, a need exists to provide delivery trucks and other service vehicles with the ability to stop when making deliveries or providing services without negatively impacting other vehicles.

SUMMARY

In one configuration, a system for controlling movement of a vehicle is provided and includes memory hardware in communication with data processing hardware, the memory hardware storing instructions that when executed on the data processing hardware cause the data processing hardware to perform operations comprising monitoring contextual events in a current, parked location of a vehicle, detection of a contextual event indicating an impending presence of a service vehicle requiring access to the parked location of the vehicle. The operations also comprise monitoring at least one vehicle sensor of the vehicle, the at least one vehicle sensor providing sensor data to the data processing hardware for use by the data processing hardware in determining the presence of a service vehicle in an area where the vehicle is parked and moving the vehicle from the current, parked location of the vehicle to a different location in response to detection of a contextual event or determination of the presence of a service vehicle in the area where the vehicle is parked.

The system may include one or more of the following optional features. For example, monitoring contextual events may include monitoring for a recognized pattern of a service vehicle. The recognized pattern may be based on at least one of a day-of-the-week, a time-of-day, third-party information, service vehicle route information, and vehicle-to-vehicle notifications.

In one configuration, the at least one vehicle sensor may include one or more of a Radio Detection and Ranging (RADAR) sensor, a Light Detection and Ranging (LiDAR) sensor, an ultra-wideband (UWB) sensor, and a microphone.

The data processing hardware may determine a type of service vehicle requiring access to the area where the vehicle is parked. Further, moving the vehicle from the current, parked location of the vehicle may be based on the type of service vehicle. Additionally or alternatively, determining the type of service vehicle may include detecting a feature of the service vehicle using the at least one vehicle sensor. Detecting a feature of the service vehicle may include at least one of detecting the presence of flashing lights of the service vehicle, detecting a siren of the service vehicle, detecting a logo of the service vehicle, reading script displayed on the service vehicle, recognizing a shape of the service vehicle, recognizing a color of the service vehicle, and/or recognizing an accessory or tool carried by the service vehicle.

In one configuration, determining the type of service vehicle requiring access to the area where the vehicle is parked may include differentiating between an emergency service vehicle and a non-emergency service vehicle, the data processing hardware configured to immediately move the vehicle from the current, parked location in response to detection of an emergency service vehicle.

A vehicle may incorporate the foregoing system.

In another configuration, a system for controlling movement of a vehicle is provided and includes memory hardware in communication with data processing hardware, the memory hardware storing instructions that when executed on the data processing hardware cause the data processing hardware to perform operations comprising monitoring contextual events in a current, parked location of a vehicle that indicate an impending presence of a service vehicle requiring access to the parked location of the vehicle, monitoring for contextual events including monitoring for recognized patterns of service vehicle movement based at least on a day-of-the-week, a time-of-day, and service vehicle route information. The operations also include moving the vehicle from the current, parked location of the vehicle to a different location in response to detection of a contextual event.

The system may include one or more of the following optional features. For example, at least one vehicle sensor may include one or more of a Radio Detection and Ranging (RADAR) sensor, a Light Detection and Ranging (LiDAR) sensor, an ultra-wideband (UWB) sensor, and a microphone, the data processing hardware configured to move the vehicle from the current, parked location of the vehicle in response to the at least one vehicle sensor detecting the presence of a service vehicle.

In one configuration, the data processing hardware may determine a type of service vehicle requiring access to an area where the vehicle is parked. The vehicle may be moved from the current, parked location of the vehicle based on the type of service vehicle. Additionally or alternatively, determining the type of service vehicle may include detecting a feature of the service vehicle using at least one vehicle sensor. Detecting a feature of the service vehicle may include at least one of detecting the presence of flashing lights of the service vehicle, detecting a siren of the service vehicle, detecting a logo of the service vehicle, reading script displayed on the service vehicle, recognizing a shape of the service vehicle, recognizing a color of the service vehicle, and/or recognizing an accessory or tool carried by the service vehicle.

In yet another configuration, a system for controlling movement of a vehicle is provided and includes memory hardware in communication with data processing hardware, the memory hardware storing instructions that when executed on the data processing hardware cause the data processing hardware to perform operations comprising monitoring at least one vehicle sensor of the vehicle that provides sensor data to the data processing hardware for use by the data processing hardware in determining the presence of a service vehicle in an area where the vehicle is parked, the data processing hardware differentiating between an emergency service vehicle and a non-emergency service vehicle based on a feature of the service vehicle detected by the at least one vehicle sensor. The operations also include moving the vehicle from the current, parked location of the vehicle to a different location in response to detection of the presence of a service vehicle in the area where the vehicle is parked.

The system may include one or more of the following optional features. For example, the at least one vehicle sensor may include one or more of a Radio Detection and Ranging (RADAR) sensor, a Light Detection and Ranging (LiDAR) sensor, an ultra-wideband (UWB) sensor, and a microphone.

In one configuration, detecting a feature of the service vehicle may include at least one of detecting the presence of flashing lights of the service vehicle, detecting a siren of the service vehicle, detecting a logo of the service vehicle, reading script displayed on the service vehicle, recognizing a shape of the service vehicle, recognizing a color of the service vehicle, and/or recognizing an accessory or tool carried by the service vehicle. Additionally or alternatively, the data processing hardware may be configured to immediately move the vehicle from the current, parked location in response to detection of an emergency service vehicle.

BRIEF DESCRIPTION OF THE DRAWINGS

The drawings described herein are for illustrative purposes only of selected configurations and are not intended to limit the scope of the present disclosure.

FIG. 2 is a functional block diagram of a body control module of the vehicle of FIG. 1 in communication with a cloud-based computer, a vehicle powertrain, and a vehicle powertrain controller;

FIG. 3 is a top schematic view of a residential neighborhood showing the vehicle of FIG. 1 in a designated parking location on a street of the residential neighborhood.

Corresponding reference numerals indicate corresponding parts throughout the drawings.

DETAILED DESCRIPTION

Figure 1:
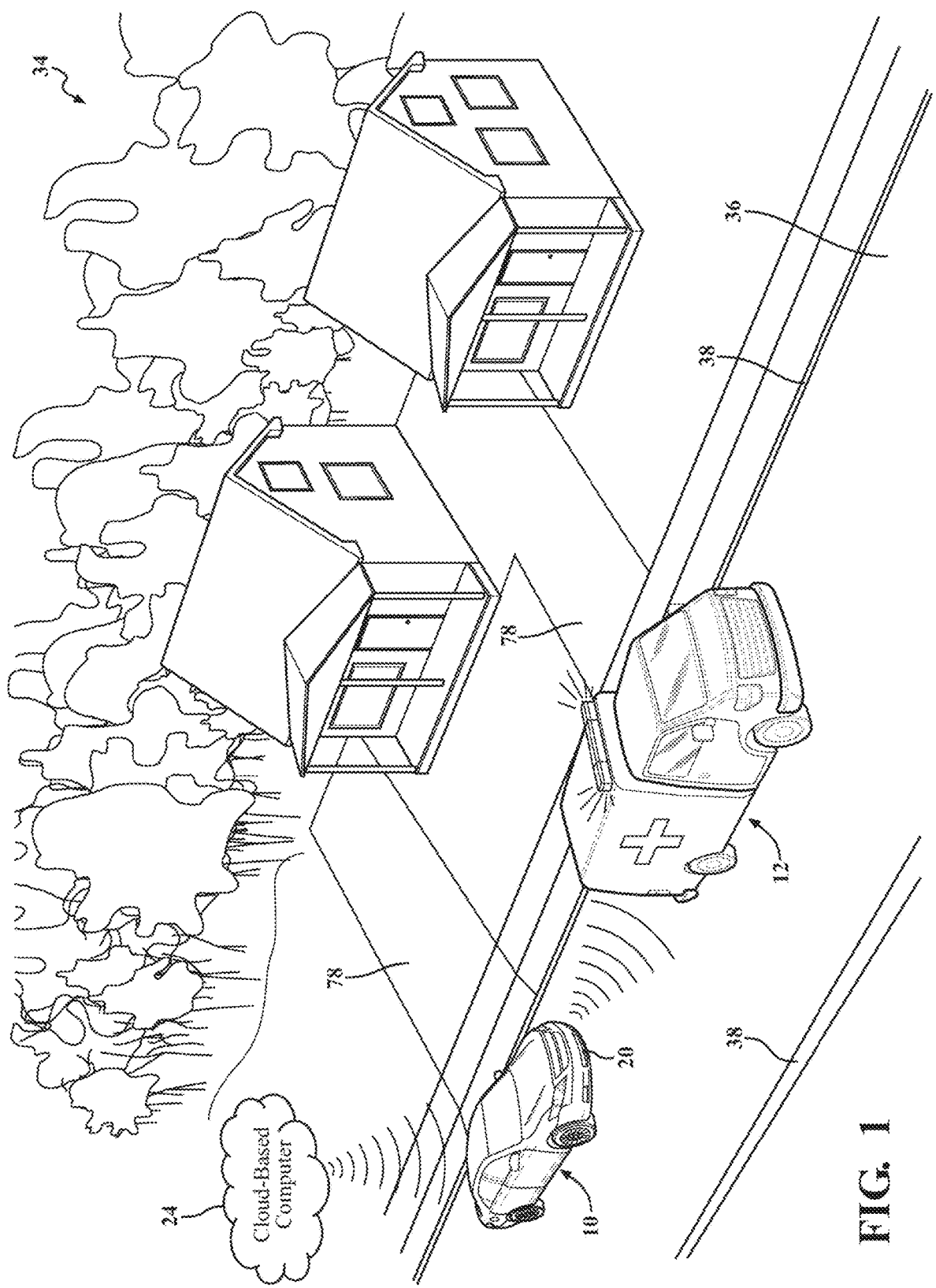
FIG. 1 is a perspective view of a vehicle in communication with a cloud-based computer and identifying a service vehicle using a system and method in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With particular reference to FIG. 1, a vehicle 10 is provided and includes a system and method that provides for movement of the vehicle 10 in response to a service vehicle 12 requiring access to a parking space or parked location in which the vehicle 10 is located. The vehicle 10 may be an electric vehicle (EV) powered by one or more electric motors (none shown), a hybrid-electric vehicle (HEV) powered by one or more electric motors and an internal combustion engine (ICE), or may be powered by an ICE. Regardless of the type of vehicle, the vehicle 10 includes autonomous or semi-autonomous driving capabilities, which allow the vehicle 10 to move from the parking space or parked location that is required by the service vehicle 12, as will be described in greater detail below.

The vehicle 10 includes a body control module (BCM) 14 including memory hardware 16 and processing hardware 18. The memory hardware 16 stores instructions that when executed by the processing hardware 18 cause the processing hardware 18 to perform functions and execute a system and method for facilitating service vehicle access in accordance with the present disclosure and as set forth in FIG. 4. Specifically, the memory hardware 16 stores instructions for when the vehicle 10 should be moved based on the presence or impending presence of a service vehicle 12. Further, the memory hardware 16 stores instructions for how long the vehicle 10 should be moved and a desired location to which the vehicle 10 should be moved based on the type of service vehicle and the context of the situation, generally.

For example, and as will be described below, the system and method stored by the memory hardware 16 and executed by the processing hardware 18 will differentiate between an emergency service vehicle 12 such as an ambulance or firetruck and a non-emergency service vehicle 12 such as a delivery vehicle or garbage truck. In the case of an emergency vehicle, the processing hardware 18 will instruct the vehicle 10 to move immediately to virtually any safe location to permit for easy and immediate access by an emergency vehicle to a currently occupied location of the vehicle 10. In the case of a non-emergency vehicle, the processing hardware 18 will instruct the vehicle 10 to move within a predetermined time period upon detection of the non-emergency service vehicle 12 or when such a non-emergency service vehicle 12 is expected to require use of the location currently occupied by the vehicle 10. Movement of the vehicle 10 may include temporarily causing the vehicle 10 to circle around a block or neighborhood for a predetermined time period, move to a different parking space or location for a predetermined time period, or move to a different parking space or location indefinitely. The memory hardware 16 stores instructions for execution by the processing hardware 18 with respect to what actions the vehicle 10 takes. These actions are based on the type of service vehicle 12 detected or expected (i.e., emergency versus non-emergency), the length of time the service vehicle 12 will require the current parked location of the vehicle 10, and the context of the situation (i.e., the service vehicle 12 is a known service vehicle 12 and/or has a learned path).

In addition to the memory hardware 16 and the processing hardware 18, the BCM 14 is also in communication with one or more vehicle sensors 20. The vehicle sensors 20 may include one or more cameras, one or more Radio Detection and Ranging (RADAR) sensors, one or more Light Detection and Ranging (LiDAR) sensors, one or more ultrawideband (UWB) sensors, and/or one or more microphones.

The vehicle sensors 20 are configured to detect conditions in and around the vehicle 10 when the vehicle 10 is in operation or when the vehicle 10 is parked. Data from the various vehicle sensors 20 may be transmitted to the BCM 14 for processing by the processing hardware 18. As will be described below, the processed sensor data may be transmitted to an external device 22 such as a cellular phone and/or tablet of the vehicle's owner and may be transmitted to a cloud-based computer 24 by way of a vehicle telematics unit (not shown) in communication with a cellular network. The sensor data may be used by the vehicle owner, the cloud-based computer 24, and/or the BCM 14 to determine whether the vehicle 10 needs to be moved to accommodate a service vehicle 12, where the vehicle 10 should be moved, and for how long the vehicle 10 should stay away from the current, parked location of the vehicle 10.

One or more of the vehicle owner, the cloud-based computer 24, and the BCM 14 may instruct the vehicle 10 to move, where to move, and for how long the vehicle 10 must stay away from the current, parked location of the vehicle 10 by communicating instructions to a vehicle powertrain controller 26. The vehicle powertrain controller 26 is in communication with and is configured to control a vehicle powertrain 28 of the vehicle 10. For example, if the vehicle 10 is an EV, should the BCM 14 determine that the vehicle 10 needs to be moved to accommodate a service vehicle 12, the BCM 14 will instruct the powertrain controller 26 to move the vehicle 10. The powertrain controller 26, in turn, will instruct one or more electric motors (none shown) of the vehicle powertrain 28 to energize and move the vehicle 10. While not shown in FIG. 2, the BCM 14 will also provide instructions to other vehicle systems such as, for example, a steering system that would also be required to autonomously move the vehicle 10 from one location to another. Further, and as shown in FIG. 2, if the functions of the vehicle powertrain controller 26 are incorporated into the BCM 14, the BCM 14 may directly control the vehicle powertrain 28, as indicated by the dashed line connecting the BCM 14 and the vehicle powertrain 28.

Figure 4:
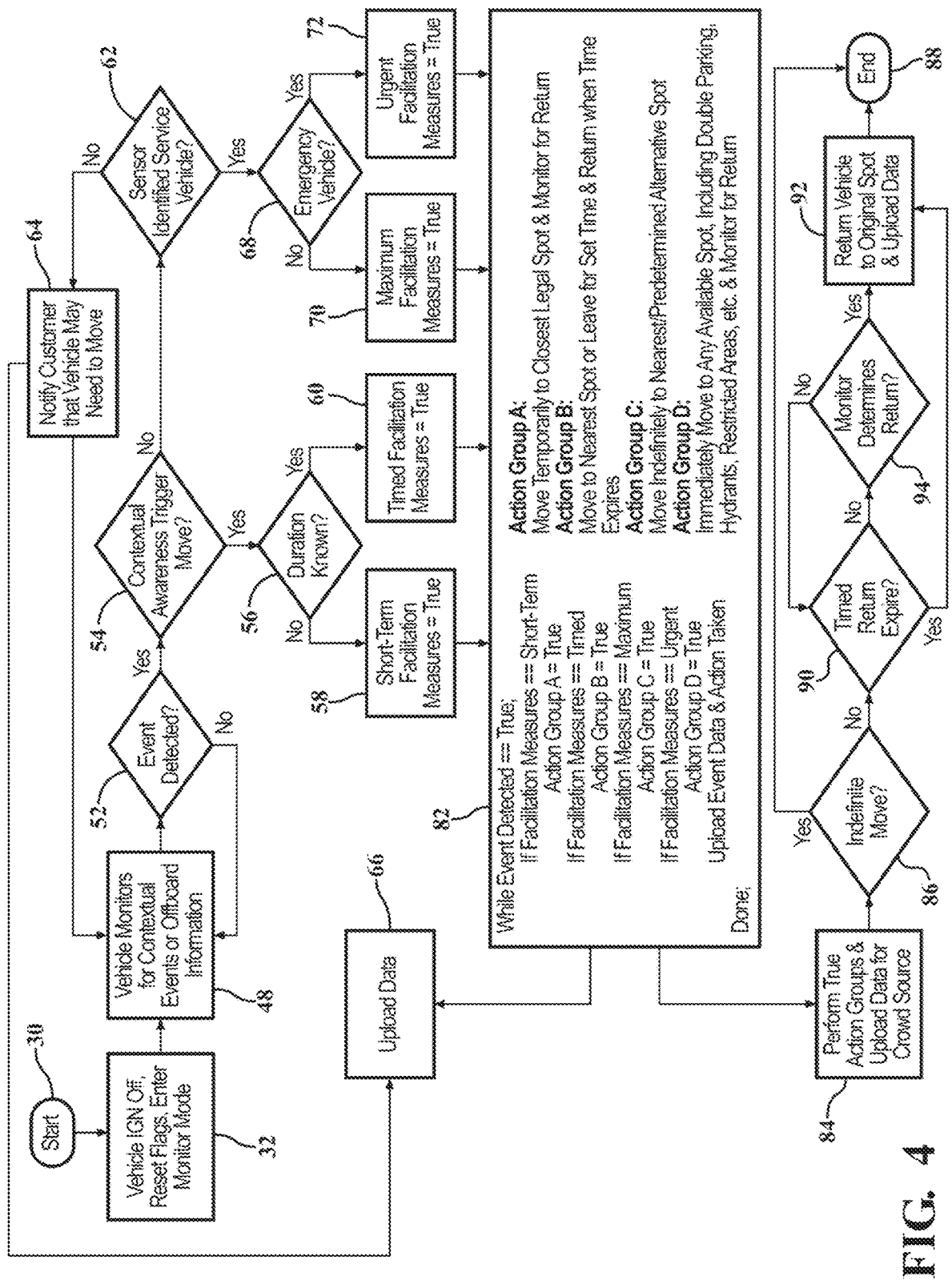
FIG. 4 is a flowchart detailing operation of a system and method for facilitating service vehicle access in accordance with the principles of the present disclosure.

With particular reference to FIGS. 3 and 4, operation of the system and method for facilitating service vehicle access will be described in detail. The system and method starts at 30. At this point, the vehicle 10 is parked at a location and the vehicle powertrain 28 and ignition are OFF at 32. In one example, the vehicle 10 may be parked in a residential neighborhood 34 (FIG. 3) and, further, may be parked along a street 36 adjacent to a curb 38 in a designated parking location 40. The designated parking location 40 may include signage and/or may be identified by a certain color paint 42 on the curb 38. Further, certain locations along the street 36 may be identified by signage 44 and/or a different colored paint 46 on the curb 38 indicating that a vehicle 10 is not permitted to park along the curb 38 at these locations. The vehicle sensors 20 may utilize the various paint colors 42, 46 and/or signage 44 when moving from the current parking location 40 to another parking location in response to the BCM 14 instructing the vehicle 10 to move from the current parking location 40.

When the vehicle 10 is parked and the vehicle powertrain 28 is OFF, the vehicle sensors 20 are continually monitoring an area in and around the vehicle 10. Further, the processing hardware 18 of the BCM 14 and/or the cloud-based computer 24 monitor the current location of the vehicle 10 for contextual events at 48. Contextual events may include events that are related to the particular location of the vehicle 10, the day-of-the-week, the time-of-day, third-party information such as receipt of a delivery route from a particular retailer, a route for a particular type of service vehicle such as a school bus, mail truck, or garbage truck, and/or vehicle-to-vehicle communications that alert the vehicle 10 that the current parked location of the vehicle 10 may be needed by another, approaching vehicle. The current location of the vehicle 10 may be obtained from a Global Positioning System (GPS) 50 associated with the BCM 14.

The BCM 14 and/or the cloud-based computer 24 continually monitors the vehicle 10 to determine whether a contextual event is detected at 52. While the BCM 14 and/or the cloud-based computer 24 could continually monitor the vehicle 10, the BCM 14 will be described and shown hereinafter as monitoring the vehicle 10.

A contextual event may be based on a recognized pattern such as, for example, a particular day or days of the week, a time of day, a stored, received, or learned schedule, third-party information such as a weather forecast, road closure information from a road authority, and/or a mass-transit schedule, a school bus route, a mail delivery route, and/or a vehicle-to-vehicle communication. Any or all of the foregoing could be used by the BCM 14 in determining that the vehicle 10 needs to move from its current location 40 to allow a service vehicle 12 to access the current location 40 of the vehicle 10. If a contextual event is not detected at 52, the BCM 14 returns to 48 and continually monitors the vehicle 10 for contextual events at 48. If a contextual event is detected at 52, the BCM 14 determines whether the detection of the contextual event requires the vehicle 10 to move at 54.

If the detected contextual event requires movement of the vehicle 10 at 54, the BCM 14 determines whether the length-of-time the vehicle 10 must be moved from its current location is known at 56. If the length-of-time is not known, the BCM 14 determines that the vehicle 10 only needs to be temporarily moved (i.e., for a short period-of-time) at 58 and implements a short-term facilitation measure. The BCM 14 will then instruct the vehicle powertrain controller 26 to move the vehicle 10 temporarily to the closest, legal parking spot and will monitor the vehicle 10 for return to its current location. If, on the other hand, the BCM 14 determines that the length-of-time is known, the BCM 14 determines that the vehicle 10 needs to be moved for a predetermined time period at 60 and implements a timed facilitation measure. At this point, the BCM 14 will instruct the vehicle powertrain controller 26 to move the vehicle 10 to the nearest parking spot that is out of a path-of-travel of a service vehicle 12 that requires use of the current location 40 of the vehicle 10 or will cause the vehicle 10 to otherwise leave its current location and circle (i.e., move in and around the current location of the vehicle 10) for the predetermined time period. The BCM 14 may initiate a timer to ensure that the vehicle 10 remains at a location away from its current location 40 for the predetermined time period, as will be described in greater detail below.

If the BCM 14 determines that the detected contextual event does not require movement of the vehicle 10 from its current location, the BCM 14 will determine whether one or more of the vehicle sensors 20 detects the presence of a service vehicle 12 at 62. If the sensors 20 do not indicate the presence of a service vehicle 12 at 62, the BCM 14 may notify the customer or vehicle owner that the vehicle 10 may require movement at some point in the future at 64. The BCM 14 will then upload the data to the cloud-based computer 24 for analysis at 66. Specifically, the BCM 14 will upload the data regarding determination of the contextual event, determination that the contextual event did not require movement of the vehicle 10 from its current location, and the sensor data 20 used to confirm the presence or lack thereof of a service vehicle 12 to the cloud-based computer 24 for use by the cloud-based computer 24 in learning and improving the algorithms implemented by the BCM 14 in making the decisions pertaining to the contextual events and the presence of a service vehicle 12. In so doing, the cloud-based computer 24 can learn traffic patterns for various service vehicles 12 of the residential neighborhood 34—especially service vehicles 12 having regular schedules such as garbage trucks, mail trucks, and school busses—and can use the traffic patterns for controlling the location of the vehicle 10 to ensure that the vehicle 10 is not in the way of a service vehicle 12.

If the BCM 14 determines that the data from the vehicle sensors 20 indicates the presence of a service vehicle 12 at 62, the BCM 14 than determines if the service vehicle 12 is an emergency vehicle at 68. The BCM 14 may determine if the service vehicle 12 is an emergency vehicle based on sensor data from the vehicle sensors 20 indicating that the service vehicle 12 is an emergency vehicle. For example, the vehicle sensors 20 may sense the presence of flashing lights, an audible siren, and/or may read text on the vehicle such as, for example, "Ambulance, "Fire," and/or "police." This information may be used by the BCM 14 in determining whether the service vehicle 12 is an emergency vehicle at 68. Further, in a similar fashion, the sensor data from the vehicle sensors 20 may indicate that the service vehicle 12 is a non-emergency vehicle by detecting the presence of a known logo from a delivery company or retailer, the presence of a particular accessory or tool such as a ladder, rake, or lawnmower in the case of a contractor, or the overall shape and/or color of a bus.

If the service vehicle 12 is determined to be a non-emergency vehicle at 68, the BCM 14 implements maximum facilitation measures at 70. Such measures result in the BCM 14 instructing the vehicle powertrain controller 26 to indefinitely move the vehicle 10 to the nearest/predetermined alternative parking spot. If the service vehicle 12 is determined to be an emergency vehicle at 68, the BCM 14 will instruct the vehicle powertrain controller 26 to implement urgent facilitation measures at 72. The urgent facilitation measures result in the BCM 14 causing the vehicle 10 to be immediately moved to any available parking sport. For example the BCM 14 may cause the vehicle 10 to be double-parked, may park the vehicle 10 in a normally restricted area such as in front of a fire hydrant 74 (FIG. 3), or may park the vehicle 10 in a spot identified by no-parking signage 44 (FIG. 3). The BCM 14 will then monitor the vehicle 10 for return to its current location. For example, when the information from the vehicle sensors 20 indicates that the emergency vehicle is no longer in the area, the BCM 14 may instruct the vehicle powertrain controller 26 to return the vehicle 10 to its current location.

With continued reference to FIG. 4, if the BCM 14 determines that short-term facilitation measures are required at 58, the BCM 14 will temporarily move the vehicle 10 to the closest legal spot and monitor the vehicle 10 for return to its current location. For example, in the schematic shown in FIG. 3, if the vehicle 10 is parked at its current location 40 (illustrated in FIG. 3 adjacent to the curb 38 proximate to the paint 42) and a service vehicle 12 such as a garbage truck requires access to the current location 40 of the vehicle 10, the BCM 14 may instruct the vehicle powertrain controller 26 to move the vehicle 10 to the parking location 76 directly across the street 36 from the current location 40. The BCM 14 may monitor the vehicle sensors 20 to determine when the garbage truck leaves the area and will instruct the vehicle powertrain controller 26 to return the vehicle 10 to the location 40 when the garbage truck leaves the area.

If the BCM 14 determines that a timed facilitation measure is required at 60, the BCM 14 may instruct the vehicle powertrain controller 26 to move the vehicle 10 for a predetermined period-of-time. For example, if a third-party such as a weather authority alerts the BCM 14 that a winter storm will occur overnight, the BCM 14 may instruct the vehicle powertrain controller 26 to move the vehicle 10 to a driveway 78 or remote parking lot 80 for a predetermined period-of-time to allow service vehicles 12 such as snow plows to access and clear snow from the street 36. The predetermined period-of-time may be based on the forecasted length of the winter storm and/or when a snow plow is expected to finish clearing the street 36, as provided by a road authority in charge of scheduling and running such snow plows or by learned and stored data from previous snow storms in and around the residential neighborhood 34. This learned and stored data may be stored by the BCM 14 and/or the cloud-based computer 24.

Maximum facilitation measures will be implemented by the BCM 14 when a service vehicle 12 is detected by the vehicle sensors 20 but the service vehicle 12 is not an emergency vehicle. For example, if the vehicle sensors 20 identify a service vehicle 12 such as a delivery truck, the BCM 14 will initiate maximum facilitation measures and instruct the vehicle powertrain controller 26 to move the vehicle 10 from its current location 40 (FIG. 3) to an alternative parking spot such as the parking location 76 directly across the street 36 from the current location 40 or to the remote parking lot 80. Further, the BCM 14 could cause the vehicle 10 to circle (i.e., drive around the current neighborhood) until the delivery truck leaves the current parked location 40 of the vehicle 10. At this point, the BCM 14 may know approximately how long such a delivery truck will require access to the parking spot 40 based on previous deliveries by the same or similar truck, and will summon the vehicle 10 back to the parking spot 40 following expiration of the predetermined time period.

In the case of an emergency vehicle, the BCM 14 will immediately instruct the vehicle powertrain controller 26 to move the vehicle 10 to virtually any location if it is determined that the emergency vehicle requires access to the current, parked location 40 of the vehicle 10 (FIG. 3). The BCM 14 could, for example, move the vehicle 10 to any driveway 78 on the street, move the vehicle 10 to an otherwise illegal or restricted parking spot (i.e., in front of the signage 44 shown in FIG. 3), or illegally park the vehicle 10 in front of a fire hydrant 74, for example—provided the emergency vehicle is not a firetruck. The BCM 14 may continually monitor the vehicle 10 and will move the vehicle 10 back to the parking location 40 when the vehicle sensors 20 no longer detect the presence of the emergency vehicle.

The foregoing control system and method is generally shown in FIG. 4 at 82. Namely, the outcome of each of blocks 58 (short-term facilitation measures), 60 (timed facilitation measures), 70 (maximum facilitation measures), and 72 (urgent facilitation measures) all lead into block 82, which may be stored in the memory hardware 16 of the BCM 14 for use by the processing hardware 18 in instructing the vehicle powertrain controller 26 when, where, and for how long to move the vehicle 10 from its current, parked location 40. The outcome of the actions taken by the processing hardware 18 may be uploaded to the cloud-based computer 24 at 66. Further, this data may be uploaded to the cloud-based computer 24 at 68 along with other crowdsourced data at 84 from other vehicles in the area for use by the cloud-based computer 24 in learning and refining the algorithm set forth at 82 when controlling movement of the vehicle 10. Specifically, the actions taken by the BCM 14 may be uploaded to the cloud-based computer 24 along with crowdsourced data from other vehicles for use by the cloud-based computer 24 in determining what other vehicles in the area determined, what actions were taken, and how the actions taken could be improved for future vehicle control.

With continued reference to FIG. 4, if the BCM 14 moves the vehicle 10 for an indefinite period of time at 86, the vehicle 10 will remain in a different location (i.e., a location different than the current, parked location 40) until the BCM 14 recalls the vehicle 10. At this point, the system and method stops at 88. While the system and method stops at 88, it should be noted that the BCM 14 remains in communication with and controls the vehicle 10 even though the vehicle 10 has been moved.

If the BCM 14 moves the vehicle 10 for a predetermined period-of-time, the BCM 14 monitors the vehicle 10 to see if the period-of-time has expired at 90. If the predetermined period-of-time has expired, the BCM 14 instructs the vehicle powertrain controller 26 to return the vehicle 10 to the current, parked location 40 at 92. If the predetermined period-of-time has not expired, but the vehicle sensors 20 monitoring the vehicle 10 indicate that the vehicle 10 may be returned to the location 40 at 94, the BCM 14 instructs the vehicle powertrain controller 26 to return the vehicle 10 to the location 40.

The system and method described herein utilizes contextual data and/or sensor data to determine the presence or impending presence of a service vehicle 12 requiring access to a current, parked location 40 of a vehicle 10. If a service vehicle 12 requires access to the parked location 40, the BCM 14 will instruct the vehicle powertrain controller 26 to move the vehicle 10 and, based on the type of service vehicle 12, will cause the vehicle 10 to move from the current parked location 40 to a different location for a predetermined period-of-time or indefinitely depending on the particular situation. In so doing, the BCM 14 ensures that the service vehicle 12 will have access to the parked location 40 and, further, that the vehicle 10 will not impede the service vehicle 12.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for controlling movement of a vehicle, the system comprising:
   memory hardware in communication with data processing hardware, the memory hardware storing instructions that when executed on the data processing hardware cause the data processing hardware to perform operations comprising:

monitoring contextual events in a current, parked location of a vehicle, detection of a contextual event indicating an impending presence of a service vehicle requiring access to the parked location of the vehicle;

monitoring at least one vehicle sensor of the vehicle, the at least one vehicle sensor providing sensor data to the data processing hardware for use by the data processing hardware in determining the presence of a service vehicle in an area where the vehicle is parked;

determining by the data processing hardware whether the service vehicle requiring access to the area where the vehicle is parked is an emergency service vehicle or a non-emergency service vehicle; and moving the vehicle from the current, parked location of the vehicle to a different location in response to detection of a contextual event or determination of the presence of a service vehicle in the area where the vehicle is parked, the vehicle being moved immediately to any available location in response to detection of an emergency service vehicle, and the vehicle being moved within a predetermined time period or to a predetermined location in response to detection of a non-emergency service vehicle.

2. The system of claim 1, wherein monitoring contextual events includes monitoring for a recognized pattern of a service vehicle.

3. The system of claim 2, wherein the recognized pattern is based on at least one of a day-of-the-week, a time-of-day, third-party information, service vehicle route information, and vehicle-to-vehicle notifications.

4. The system of claim 1, wherein the at least one vehicle sensor includes one or more of a Radio Detection and Ranging (RADAR) sensor, a Light Detection and Ranging (LiDAR) sensor, an ultra-wideband (UWB) sensor, and a microphone.

5. The system of claim 1, wherein determining whether the service vehicle requiring access to the area where the vehicle is parked is an emergency service vehicle or a non-emergency service vehicle further includes detecting a feature of the service vehicle using the at least one vehicle sensor.

6. The system of claim 5, wherein detecting a feature of the service vehicle includes at least one of detecting the presence of flashing lights of the service vehicle, detecting a siren of the service vehicle, detecting a logo of the service vehicle, reading script displayed on the service vehicle, recognizing a shape of the service vehicle, recognizing a color of the service vehicle, and/or recognizing an accessory or tool carried by the service vehicle.

7. A vehicle incorporating the system of claim 1.

8. The system of claim 1, wherein the operations further include initiating a timer to control a duration for which the vehicle remains at the different location, the timer being set based on an expected duration of access required by the service vehicle.

9. The system of claim 1, wherein monitoring contextual events further includes receiving and processing third-party information, including weather forecasts, road closure notifications, and/or service vehicle schedules.

10. The system of claim 1, wherein the operations further include uploading data regarding detected contextual events, sensor data, and vehicle movement actions to a cloud-based computer for analysis and algorithm refinement, and to receive updated instructions or learned patterns from the cloud-based computer to improve future vehicle movement decisions.

11. A system for controlling movement of a vehicle, the system comprising:

memory hardware in communication with data processing hardware, the memory hardware storing instructions that when executed on the data processing hardware cause the data processing hardware to perform operations comprising:

monitoring contextual events in a current, parked location of a vehicle that indicate an impending presence of a service vehicle requiring access to the parked location of the vehicle, monitoring for contextual events including monitoring for recognized patterns of service vehicle movement based at least on a day-of-the-week, a time-of-day, and service vehicle route information;

determining by the data processing hardware whether the service vehicle requiring access to the parked location of the vehicle is an emergency service vehicle or a non-emergency service vehicle;

moving the vehicle immediately from the current, parked location of the vehicle to any available location in response to detection of a contextual event that indicates an emergency service vehicle; and moving the vehicle from the current, parked location of the vehicle within a predetermined time period or to a predetermined location in response to detection of a contextual event that indicates a non-emergency service vehicle.

12. The system of claim 11, further comprising at least one vehicle sensor including one or more of a Radio Detection and Ranging (RADAR) sensor, a Light Detection and Ranging (LiDAR) sensor, an ultra-wideband (UWB) sensor, and a microphone, the data processing hardware configured to move the vehicle from the current, parked location of the vehicle in response to the at least one vehicle sensor detecting the presence of a service vehicle.

13. The system of claim 11, wherein determining whether the service vehicle requiring access to the parked location of the vehicle is an emergency service vehicle or a non-emergency service vehicle includes detecting a feature of the service vehicle using at least one vehicle sensor.

14. The system of claim 13, wherein detecting a feature of the service vehicle includes at least one of detecting the presence of flashing lights of the service vehicle, detecting a siren of the service vehicle, detecting a logo of the service vehicle, reading script displayed on the service vehicle, recognizing a shape of the service vehicle, recognizing a color of the service vehicle, and/or recognizing an accessory or tool carried by the service vehicle.

15. The system of claim 11, wherein the operations further include initiating a timer to control a duration for which the vehicle remains at the available location, the timer being set based on an expected duration of access required by the service vehicle.

16. The system of claim 11, wherein monitoring contextual events further includes receiving and processing third-party information, including weather forecasts, road closure notifications, and/or service vehicle schedules.

17. A system for controlling movement of a vehicle, the system comprising:

memory hardware in communication with data processing hardware, the memory hardware storing instructions that when executed on the data processing hardware cause the data processing hardware to perform operations comprising:
monitoring at least one vehicle sensor of the vehicle that provides sensor data to the data processing hardware for use by the data processing hardware in determining the presence of a service vehicle in an area where the vehicle is parked, the data processing hardware differentiating between an emergency service vehicle and a non-emergency service vehicle based on a feature of the service vehicle detected by the at least one vehicle sensor;
determining by the data processing hardware whether the service vehicle requiring access to the area where the vehicle is parked is an emergency service vehicle or a non-emergency service vehicle;
moving the vehicle immediately from the current, parked location of the vehicle to any available location in response to detection of the presence of a service vehicle in the area where the vehicle is parked; and
moving the vehicle from the current, parked location of the vehicle within a predetermined time period or to a predetermined location in response to detection of the presence of a non-emergency service vehicle in the area where the vehicle is parked.

18. The system of claim 17, wherein the at least one vehicle sensor includes one or more of a Radio Detection and Ranging (RADAR) sensor, a Light Detection and Ranging (LiDAR) sensor, an ultra-wideband (UWB) sensor, and a microphone.

19. The system of claim 17, wherein detecting a feature of the service vehicle includes at least one of detecting the presence of flashing lights of the service vehicle, detecting a siren of the service vehicle, detecting a logo of the service vehicle, reading script displayed on the service vehicle, recognizing a shape of the service vehicle, recognizing a color of the service vehicle, and/or recognizing an accessory or tool carried by the service vehicle.

20. The system of claim 17, wherein the operations further include notifying a user or vehicle owner, via an external device, when the presence of a service vehicle is detected and the vehicle is about to be moved from its current, parked location.

* * * * *